United States Patent
Lewis

(10) Patent No.: US 10,192,166 B2
(45) Date of Patent: Jan. 29, 2019

(54) COMPUTATION OF RECEIVER OPERATING CHARACTERISTIC CURVES

(71) Applicant: SAS Institute Inc., Cary, NC (US)

(72) Inventor: Lawrence E. Lewis, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 957 days.

(21) Appl. No.: 14/208,302

(22) Filed: Mar. 13, 2014

(65) Prior Publication Data

US 2014/0324762 A1     Oct. 30, 2014

Related U.S. Application Data

(60) Provisional application No. 61/816,731, filed on Apr. 27, 2013.

(51) Int. Cl.
  *G06N 7/00*     (2006.01)
(52) U.S. Cl.
  CPC .................................. *G06N 7/005* (2013.01)
(58) Field of Classification Search
  CPC   G06N 7/00; G06N 7/02; G06N 7/005; G06N 3/00; G06N 5/00
  USPC ......................................................... 706/52
  See application file for complete search history.

(56) References Cited

U.S. PATENT DOCUMENTS

| | | | |
|---|---|---|---|
| 5,842,199 A | 11/1998 | Miller et al. | |
| 8,050,929 B2 * | 11/2011 | Hu | G10L 15/1822 704/236 |
| 8,271,537 B2 | 9/2012 | Schabenberger et al. | |
| 8,494,808 B2 | 7/2013 | Portnoy | |
| 8,768,868 B1 * | 7/2014 | Cheng | G06N 5/00 382/224 |

OTHER PUBLICATIONS

SAS Institute Inc. 2013. *Grid Computing in SAS® 9.4, Second Edition.* Cary, NC: SAS Institute Inc.

* cited by examiner

*Primary Examiner* — Dave Misir
(74) *Attorney, Agent, or Firm* — Bell & Manning, LLC

(57) ABSTRACT

A method of determining a false and/or a true positive rate is provided. A true count value and a false count value are initialized for probability bins. For a plurality of records, a truth of event occurrence and a probability of occurrence are read; a probability bin that includes the probability of occurrence is determined; the true count value of the determined probability bin is incremented when the truth of event occurrence indicates true; and the false count value of the determined probability bin is incremented when the truth of event occurrence indicates false. A true positive rate and a false positive rate are computed for each probability bin based on the true count value, the false count value, a determined total number of true event occurrences, and a determined total number of false event occurrences.

24 Claims, 8 Drawing Sheets

COMPUTATION OF RECEIVER OPERATING CHARACTERISTIC CURVES

CROSS-REFERENCE TO RELATED APPLICATIONS

The present application claims the benefit of 35 U.S.C. §119(e) to U.S. Provisional Patent Application No. 61/816,731 filed Apr. 27, 2013, the entire contents of which are hereby incorporated by reference.

BACKGROUND

Receiver operating characteristic (ROC) curves have been used to help evaluate the quality of models that predict the probability of a binary variable over a range of observations.

SUMMARY

In an example embodiment, a method of determining a false and/or a true positive rate is provided. A true count value is initialized for each of a defined number of probability bins. A false count value is initialized for each of the defined number of probability bins. For a plurality of records, a truth of event occurrence is read from a record of the plurality of records; a probability of occurrence is read from the record; a probability bin of the probability bins that includes the probability of occurrence is determined; the true count value of the determined probability bin is incremented when the truth of event occurrence indicates true; and the false count value of the determined probability bin is incremented when the truth of event occurrence indicates false. A total number of true event occurrences is determined. A total number of false event occurrences is determined. A true positive rate is computed for each probability bin of the probability bins based on the true count value of the probability bin and the determined total number of true event occurrences. A false positive rate is computed for each probability bin of the probability bins based on the false count value of the probability bin and the determined total number of false event occurrences. The true positive rate and the false positive rate are output for each probability bin of the probability bins.

In another example embodiment, a computer-readable medium is provided having stored thereon computer-readable instructions that when executed by a computing device, cause the computing device to perform the method of determining a false and/or a true positive rate.

In yet another example embodiment, a system is provided. The system includes, but is not limited to, a processor and a computer-readable medium operably coupled to the processor. The computer-readable medium has instructions stored thereon that, when executed by the processor, cause the system to perform the method of determining a false and/or a true positive rate.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
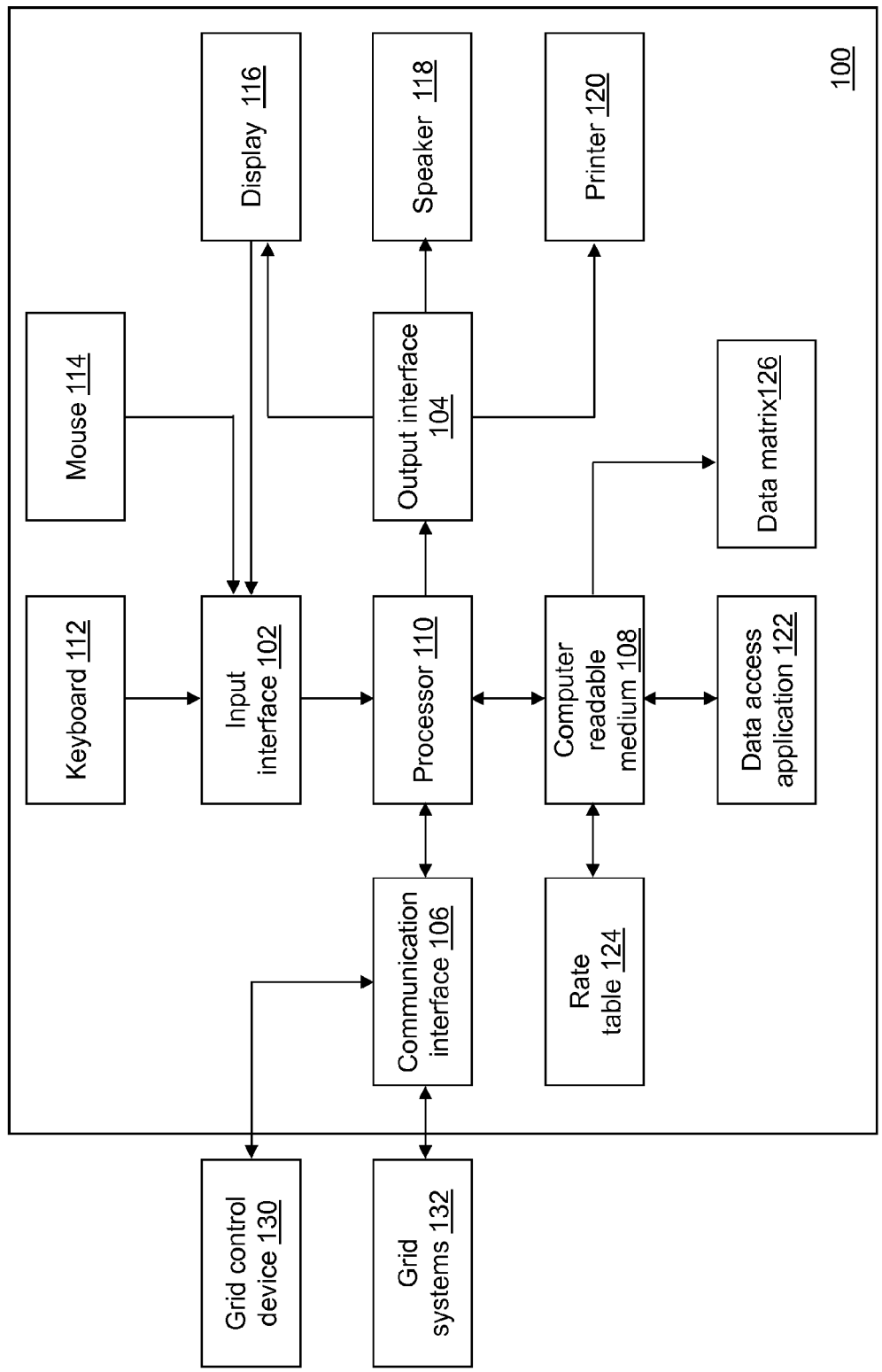
FIG. 1 depicts a block diagram of a data access device in accordance with an illustrative embodiment.

Referring to FIG. 1, a block diagram of a data access device 100 is shown in accordance with an illustrative embodiment. Data access device 100 may include an input interface 102, an output interface 104, a communication interface 106, a computer-readable medium 108, a processor 110, a data access application 122, a rate table 124, and a data matrix 126. Fewer, different, and/or additional components may be incorporated into data access device 100.

Input interface 102 provides an interface for receiving information from the user for entry into data access device 100 as understood by those skilled in the art. Input interface 102 may interface with various input technologies including, but not limited to, a keyboard 112, a mouse 114, a display 116, a track ball, a keypad, a microphone, one or more buttons, etc. to allow the user to enter information into data access device 100 or to make selections presented in a user interface displayed on display 116. The same interface may support both input interface 102 and output interface 104. For example, a touch screen display supports user input and presents output to the user. Data access device 100 may have one or more input interfaces that use the same or a different input interface technology. The input interface technology further may be accessible by data access device 100 through communication interface 106.

Output interface 104 provides an interface for outputting information for review by a user of data access device 100. For example, output interface 104 may interface with various output technologies including, but not limited to, display 116, a speaker 118, a printer 120, etc. Data access device 100 may have one or more output interfaces that use the same or a different output interface technology. The output interface technology further may be accessible by data access device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data access device 100 may have one or more communication interfaces that use the same or a different communication interface technology. For example, data access device 100 may support communication using an Ethernet port, a Bluetooth antenna, a telephone jack, a USB port, etc. Data and messages may be transferred between data access device 100 and a grid control device 130 and/or grid systems 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data access device 100 may have one or more computer-readable media that use the same or a different memory media technology. Data access device 100 also may have one or more drives that support the loading of a memory media such as a CD, DVD, an external hard drive, etc. One or more external hard drives further may be connected to data access device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data access device 100 may include a plurality of processors that use the same or a different processing technology.

Data access application 122 performs operations associated with defining date stored in rate table 124. Some or all of the operations described herein may be embodied in data access application 122. The operations may be implemented using hardware, firmware, software, or any combination of these methods. Referring to the example embodiment of FIG. 1, data access application 122 is implemented in software (comprised of computer-readable and/or computer-executable instructions) stored in computer-readable medium 108 and accessible by processor 110 for execution of the instructions that embody the operations of data access application 122. Data access application 122 may be written using one or more programming languages, assembly languages, scripting languages, etc.

Data access application 122 may be implemented as a Web application. For example, data access application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Data matrix 126 may include a plurality of rows and one or more columns. The rows of data matrix 126 may be referred to as observations, and the columns may be referred to as variables that define data points associated with the respective observation. In an alternative embodiment, data matrix 126 may be transposed.

The data stored in data matrix 126 may include any type of content represented in any computer-readable format such as binary, alphanumeric, numeric, string, markup language, etc. that further may be encoded using various encoding techniques as understood by a person of skill in the art. The content may include textual information, graphical information, image information, audio information, numeric information, etc. Data matrix 126 may be stored in computer-readable medium 108 and/or on one or more other computing devices such as grid control device 130 and/or grid systems 132 and accessed using communication interface 106. For example, data matrix 126 may be stored in a cube of data distributed across grid systems 132 as understood by a person of skill in the art. Data matrix 126 may be stored using various formats as known to those skilled in the art including a file system, a relational database, a system of tables, a structured query language database, a block of data, etc.

Figure 2A:
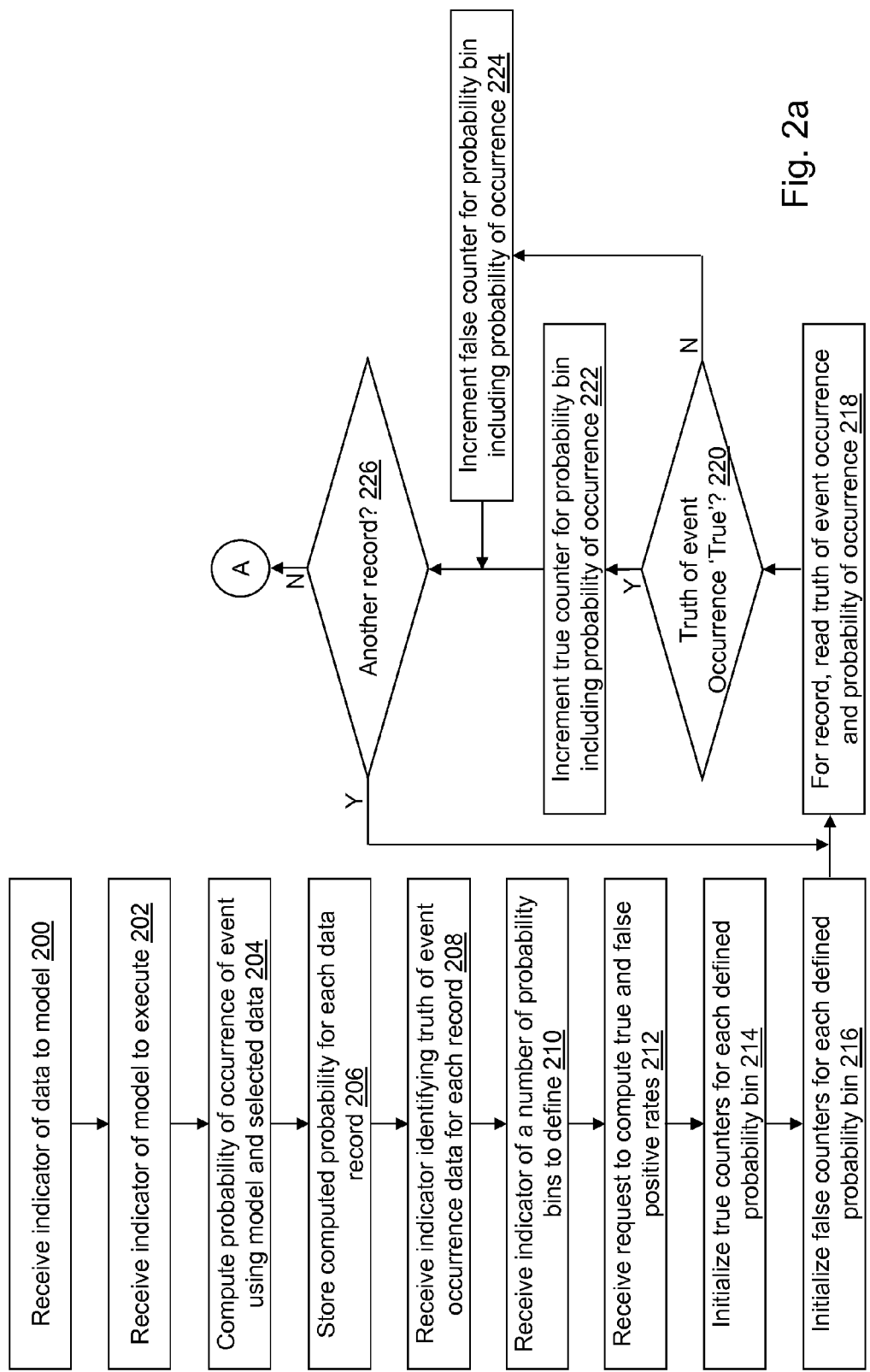
FIGS. 2a and 2b depict a flow diagram illustrating examples of operations performed by the data access device of FIG. 1 in accordance with an illustrative embodiment.
Figure 2B:
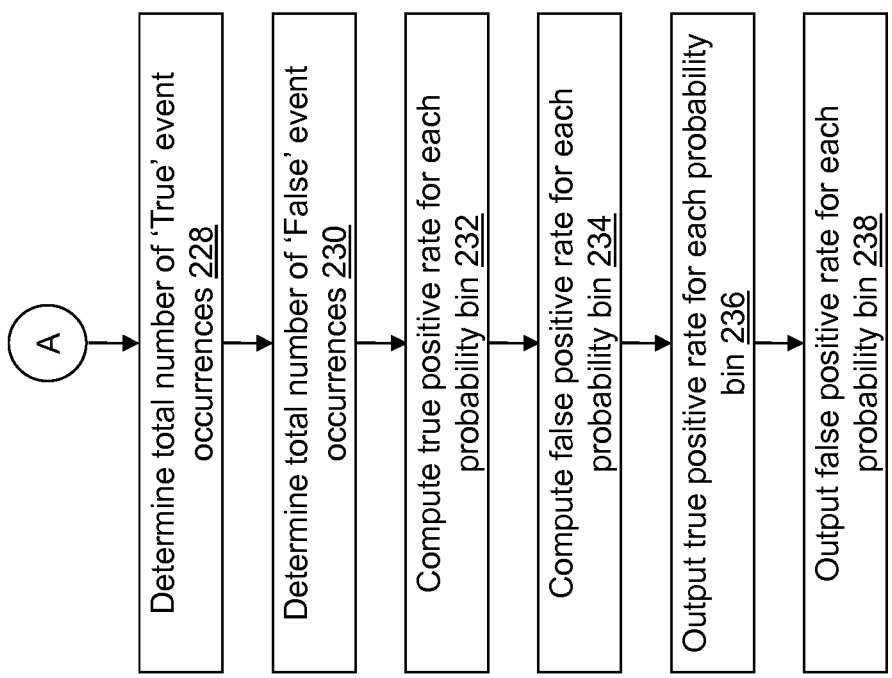

Referring to FIGS. 2a and 2b, example operations associated with data access application 122 are described. Additional, fewer, or different operations may be performed depending on the embodiment. The order of presentation of the operations of FIGS. 2a and 2b is not intended to be limiting. Although some of the operational flows are presented in sequence, the various operations may be performed in various repetitions, concurrently (in parallel, for example, using threads), and/or in other orders than those that are illustrated. A user may execute data access application 122, which causes presentation of a first user interface window, which may include a plurality of menus and selectors such as drop down menus, buttons, text boxes, hyperlinks, etc. associated with data access application 122 as understood by a person of skill in the art. As used herein, an indicator indicates one or more user selections from a user interface, one or more data entries into a data field of the user interface, one or more data items read from computer-readable medium 108 or otherwise defined with one or more default values, etc.

In an operation 200, a first indicator of data to model is received. For example, the first indicator indicates a location of data matrix 126. As an example, the first indicator may be received by data access application 122 after selection from a user interface window or after entry by a user into a user interface window. In an alternative embodiment, the data to model may not be selectable. For example, a most recently created data set may be used automatically.

In an operation 202, a second indicator of a model to execute with the data to model is received. For example, the second indicator indicates a name of a model. The second indicator may be received by data access application 122 after selection from a user interface window or after entry by a user into a user interface window. A default value for the model to execute may further be stored, for example, in computer-readable medium 108. In an alternative embodiment, the model may not be selectable, but may be used automatically.

In an operation 204, the model indicated in operation 202 is executed to model the data indicated in operation 200 by computing a probability of occurrence of an event. The data may be received from one or more devices through communication interface 106 and/or may be received from storage in computer-readable medium 108.

In an operation 206, the computed probability of occurrence of the event may be stored on one or more devices and/or on computer-readable medium 108. For example, the computed probability of occurrence of the event based on the model and the input variables may be stored in data matrix 126 as an additional column of data. An example data matrix 126 is shown in Table I below that includes six variables input to the model and used to compute the probability of occurrence of the event that is stored in the column labeled "Prob of Occ":

TABLE I

Data Matrix

| Var1 | Var2 | Var3 | Var4 | Var5 | Var6 | Prob of Occ | Truth |
|------|------|------|------|------|------|-------------|-------|
| 30   | 46   | 2    | 47   | 2    | 3    | 0.09        | False |
| 62   | 46   | 12   | 47   | 8    | 3    | 0.15        | False |
| 1000 | 45   | 1200 | 47   | 5    | 6    | 0.8         | True  |
| 0.20 | 55   | 5    | 1200 | 54   | 5    | 0.7         | True  |
| 18   | 54   | 22   | 1200 | 6    | 4    | 0.17        | False |

In an operation 208, a third indicator identifying a truth of event occurrence data for each record is received. For example, the third indicator may indicate that the data stored in the column labeled "Truth", or the eighth column included in the example data matrix 126 shown in Table I, includes the truth of event occurrence data for each record. The third indicator may be received by data access application 122 after a selection from a user interface window or after entry by a user into a user interface window. A default value for the third indicator may be the last column of data stored in data matrix 126. In an alternative embodiment, the third indicator may not be selectable. For example, the last (or rightmost) column of data stored in data matrix 126 may always include the truth of event occurrence data for each record.

In an operation 210, a fourth indicator of a value of a number of probability bins to define is received. The fourth indicator may be received by data access application 122 after a selection from a user interface window or after entry by a user into a user interface window. A default value for the number of probability bins to define may further be stored, for example, in computer-readable medium 108. In an alternative embodiment, the number of probability bins to define may not be selectable and the default value may be used.

Rate table 124 includes a plurality of rows and one or more columns. The rows of rate table 124 are associated with a probability bin. A first column of rate table 124 may include a probability threshold value associated with the probability bin, a second column may include a true positive rate, and a third column may include a false positive rate. In an alternative embodiment, the first column of rate table 124 may include a maximum probability value associated with the probability bin. In an alternative embodiment, rate table 124 may be transposed. An example rate table 124 is shown in Table II below where the first column includes a probability threshold value for a probability bin, the second column includes the true positive rate, and the third column includes the false positive rate:

TABLE II

Rate Table

| Probability Threshold Value | True Positive Rate | False Positive Rate |
|---|---|---|
| 0.0 | 1.0 | 1.0 |
| 0.1 | 1.0 | 0.91 |
| 0.2 | 1.0 | 0.64 |
| 0.3 | 0.75 | 0.45 |
| 0.4 | 0.5 | 0.45 |
| 0.5 | 0.5 | 0.27 |
| 0.6 | 0.5 | 0.18 |
| 0.7 | 0.5 | 0.18 |
| 0.8 | 0.25 | 0.09 |
| 0.9 | 0.0 | 0.0 |
| 1.0 | 0.0 | 0.0 |

Rate table 124 may include one or more additional columns of data and the columns may be included in different orders than those discussed with reference to the illustrative embodiment above.

In the illustrative rate table 124 above, the value of the number of probability bins to define was 10 though there are 11 rows of data. An additional probability bin having a value of 1.0 was added as the eleventh probability bin. In alternative embodiments, the number of rows of data in rate table 124 is the value of the number of probability bins to define and an additional probability bin having a value of 1.0 is not added to rate table 124.

In an operation 212, a request to compute true and false positive rates for the data indicated in operation 200 is received. For example, the request may be received by data access application 122 after selection by a user of a button in a user interface window.

In an operation 214, true count values for each defined probability bin are initialized. For example, a true count value associated with each probability bin defined in operation 210 may be initialized to zero.

In an operation 216, false count values for each defined probability bin are initialized. For example, a false count value associated with each probability bin defined in operation 210 may be initialized to zero.

In an operation 218, a truth of event occurrence and a probability of occurrence are read from a record in the data indicated in operation 200, which may be a row in data matrix 126. As an example, the value in column seven of a first row in the example data matrix 126 above may be read as the probability of occurrence, and the value in column eight of the first row in the example data matrix 126 above may be read as the truth of event occurrence.

In an operation 220, a determination is made concerning whether or not the truth of event occurrence is "True" or has some other value that is understood to indicate "True". If the truth of event occurrence is "True", processing continues in an operation 222. If the truth of event occurrence is not "True", processing continues in an operation 224.

In operation 222, the true count value for the probability bin including the probability of occurrence read from the record is incremented. For example, if the true count values are stored as an array, an index may be calculated by dividing the probability of occurrence read from the record by the number of probability bins defined to determine which true count value to increment. As another example, the probability of occurrence read from the record may be compared to a threshold associated with each probability bin to determine which true count value is incremented.

In operation 224, the false count value for the probability bin including the probability of occurrence read from the record is incremented. For example, if the false count values are stored as an array, an index may be calculated by dividing the probability of occurrence read from the record by the number of probability bins defined to determine which false count value to increment. As another example, the probability of occurrence read from the record may be compared to a threshold associated with each probability bin to determine which false count value is incremented.

In an operation 226, a determination is made concerning whether or not the data indicated in operation 200 includes another record to process. If the data indicated in operation 200 includes another record to process, processing continues in an operation 218. If the data indicated in operation 200 does not include another record to process, processing continues in an operation 228.

In operation 228, a total number of "True" event occurrences is determined. For example, the total number of "True" event occurrences may be determined by adding the true count value in each probability bin. As another example, the total number of "True" event occurrences may be determined using a total true count value that is also incremented in operation 222.

In operation 230, a total number of "False" event occurrences is determined. For example, the total number of "False" event occurrences may be determined by adding the false count value in each probability bin. As another example, the total number of "False" event occurrences may be determined using a total false count value that is also incremented in operation 224. For example, Table III below shows a sample counter table for ten probability bins defined for a dataset.

TABLE III

Sample counter Table

| Probability | # of Positives | # of Negatives |
|---|---|---|
| [0, 0.1) | 0 | 1 |
| [0.1, 0.2) | 0 | 3 |
| [0.2, 0.3) | 1 | 2 |
| [0.3, 0.4) | 1 | 0 |
| [0.4, 0.5) | 0 | 2 |
| [0.5. 0.6) | 0 | 1 |
| [0.6, 0.7) | 0 | 0 |
| [0.7, 0.8) | 1 | 1 |
| [0.8, 0.9) | 1 | 1 |
| [0.9, 1.0] | 0 | 0 |
| Total Count: [0, 1.0] | 4 | 11 |

In operation 232, a true positive rate is computed for each probability bin. For example, a number of true positives for each probability bin is determined by accumulating a true count value for successive probability bins of the probability bins and subtracting the accumulated true count value for each probability bin from the total number of "True" event occurrences. The true positive rate for each probability bin is computed by dividing the number of true positives for each probability bin by the determined total number of "True" event occurrences.

In operation 234, a false positive rate is computed for each probability bin. For example, a number of false positives for each probability bin is determined by accumulating a false count value for successive probability bins of the probability bins and subtracting the accumulated false count value for each probability bin from the determined total number of "False" event occurrences. The false positive rate for each probability bin is computed by dividing the number of false positives for each probability bin by the determined total number of "False" event occurrences.

For example, Table IV below shows a sample cumulative counter table for the 10 probability bins defined for the dataset.

TABLE IV

Sample Cumulative Counter Table

| Probability | # of Positives | # of Negatives |
|---|---|---|
| <0.1 | 0 | 1 |
| <0.2 | 0 | 4 |
| <0.3 | 1 | 6 |
| <0.4 | 2 | 6 |
| <0.5 | 2 | 8 |
| <0.6 | 2 | 9 |
| <0.7 | 2 | 9 |
| <0.8 | 3 | 10 |
| <0.9 | 4 | 11 |
| <=1.0 | 4 | 11 |

Table V below shows a sample subtracted counter table for the 10 probability bins defined for the dataset.

TABLE V

Sample Subtracted Counter Table

| Probability | #True Positives | # False Positives |
|---|---|---|
| >=0.0 | 4 − 0 = 4 | 11 − 0 = 11 |
| >=0.1 | 4 − 0 = 4 | 11 − 1 = 10 |
| >=0.2 | 4 − 0 = 4 | 11 − 4 = 7 |
| >=0.3 | 4 − 1 = 3 | 11 − 6 = 5 |
| >=0.4 | 4 − 2 = 2 | 11 − 6 = 5 |
| >=0.5 | 4 − 2 = 2 | 11 − 8 = 3 |
| >=0.6 | 4 − 2 = 2 | 11 − 9 = 2 |
| >=0.7 | 4 − 2 = 2 | 11 − 9 = 2 |
| >=0.8 | 4 − 3 = 1 | 11 − 10 = 1 |
| >=0.9 | 4 − 4 = 0 | 11 − 11 = 0 |
| =1.0 | 4 − 4 = 0 | 11 − 11 = 0 |

In an operation 236, the true positive rate computed for each probability bin is output. For example, the true positive rate computed for each probability bin may be stored in a column of rate table 124 in computer-readable medium 108. As another example, the true positive rate computed for each probability bin may be output to the user using display 116 or printer 120. The true positive rate computed for each probability bin may be output using a graph with the probability bins on an x-axis and the true positive rate on a y-axis.

In an operation 238, the false positive rate computed for each probability bin is output. For example, the false positive rate computed for each probability bin may be stored in a second column of rate table 124 in computer-readable medium 108. As another example, the false positive rate computed for each probability bin may be output to the user using display 116 or printer 120. The false positive rate computed for each probability bin may be output using a graph with the probability bins on the x-axis and the false positive rate on the y-axis. As another example, the true positive rate and the false positive rate computed for each probability bin may be output using a graph with the false positive rate on the x-axis and the true positive rate on the y-axis.

Figure 3:
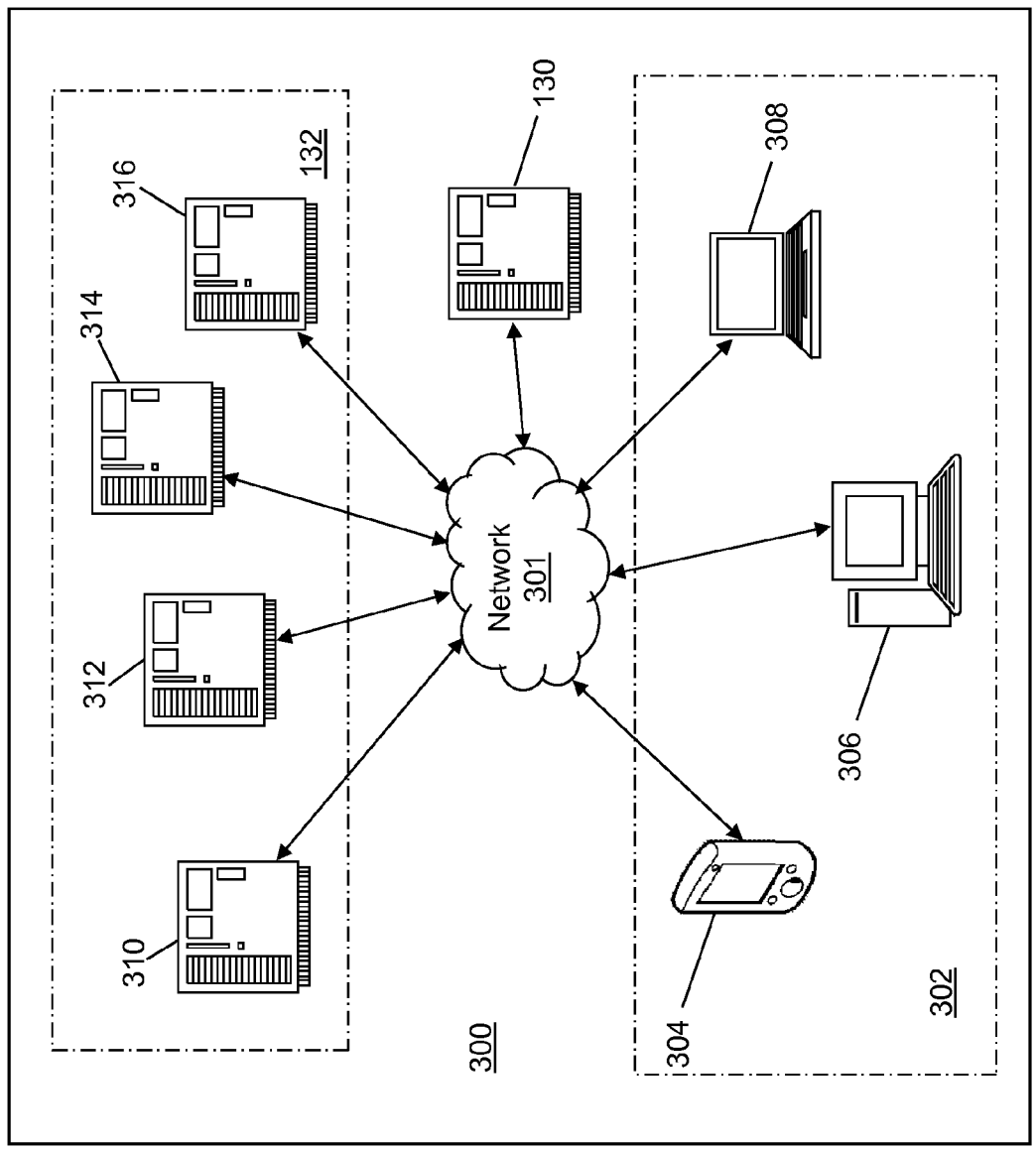
FIG. 3 depicts a block diagram of a receiver operating characteristic (ROC) curve determination system in accordance with an illustrative embodiment.

Referring to FIG. 3, a block diagram of a receiver operating characteristic (ROC) curve determination system 300 is shown in accordance with an illustrative embodiment. In an illustrative embodiment, ROC curve determination system 300 may include grid systems 132, data access systems 302, grid control device 130, and a network 301. Grid systems 132 store data matrix 126 as a cube of data. Data access systems 302 access data stored in the cube of data distributed to the grid systems 132. Grid control device 130 coordinates and controls access by data access systems 302 to the data stored by the grid systems 132. One or more components of ROC curve determination system 300 may support multithreading, as understood by a person of skill in the art.

The components of ROC curve determination system 300 may be located in a single room or adjacent rooms, in a single facility, and/or may be distributed geographically from one another. Each of grid systems 132, data access systems 302, and grid control device 130 may be composed of one or more discrete devices.

Network 301 may include one or more networks of the same or different types. Network 301 can be any type of wired and/or wireless public or private network including a cellular network, a local area network, a wide area network such as the Internet, etc. Network 301 further may comprise sub-networks and consist of any number of devices.

Data access systems 302 can include any number and type of computing devices that may be organized into subnets. Data access device 100 is an example computing device of data access systems 302. The computing devices of data access systems 302 send and receive communications through network 301 to/from grid systems 132 and/or to/from grid control device 130. The one or more computing devices of data access systems 302 may include computers of any form factor such as a laptop 308, a desktop 306, a smart phone 304, a personal digital assistant, an integrated messaging device, a tablet computer, etc. The one or more computing devices of data access systems 302 may communicate using various transmission media that may be wired and/or wireless as understood by those skilled in the art.

For illustration, FIG. 3 represents grid systems 132 with a first server computer 310, a second server computer 312, a third server computer 314, and a fourth server computer 316. Grid systems 132 can include any number and form factor of computing devices that may be organized into subnets. The computing devices of grid systems 132 send and receive communications through network 301 to/from another of the one or more computing devices of grid systems 132, to/from grid control device 130, and/or to/from data access systems 302. The one or more computing devices of grid systems 132 may communicate using various transmission media that may be wired and/or wireless as understood by those skilled in the art.

In the illustrative embodiment, grid control device 130 is represented as a server computing device though grid control device 130 may include one or more computing devices of any form factor that may be organized into subnets. Grid control device 130 sends and receives communications through network 301 to/from grid systems 132 and/or to/from data access systems 302. Grid control device 130 may communicate using various transmission media that may be wired and/or wireless as understood by those skilled in the art.

Grid control device 130 and grid systems 132 may be implemented as a multi-node Hadoop® cluster, as understood by a person of skill in the art. Apache™ Hadoop® is an open-source software framework for distributed computing.

Figure 4:
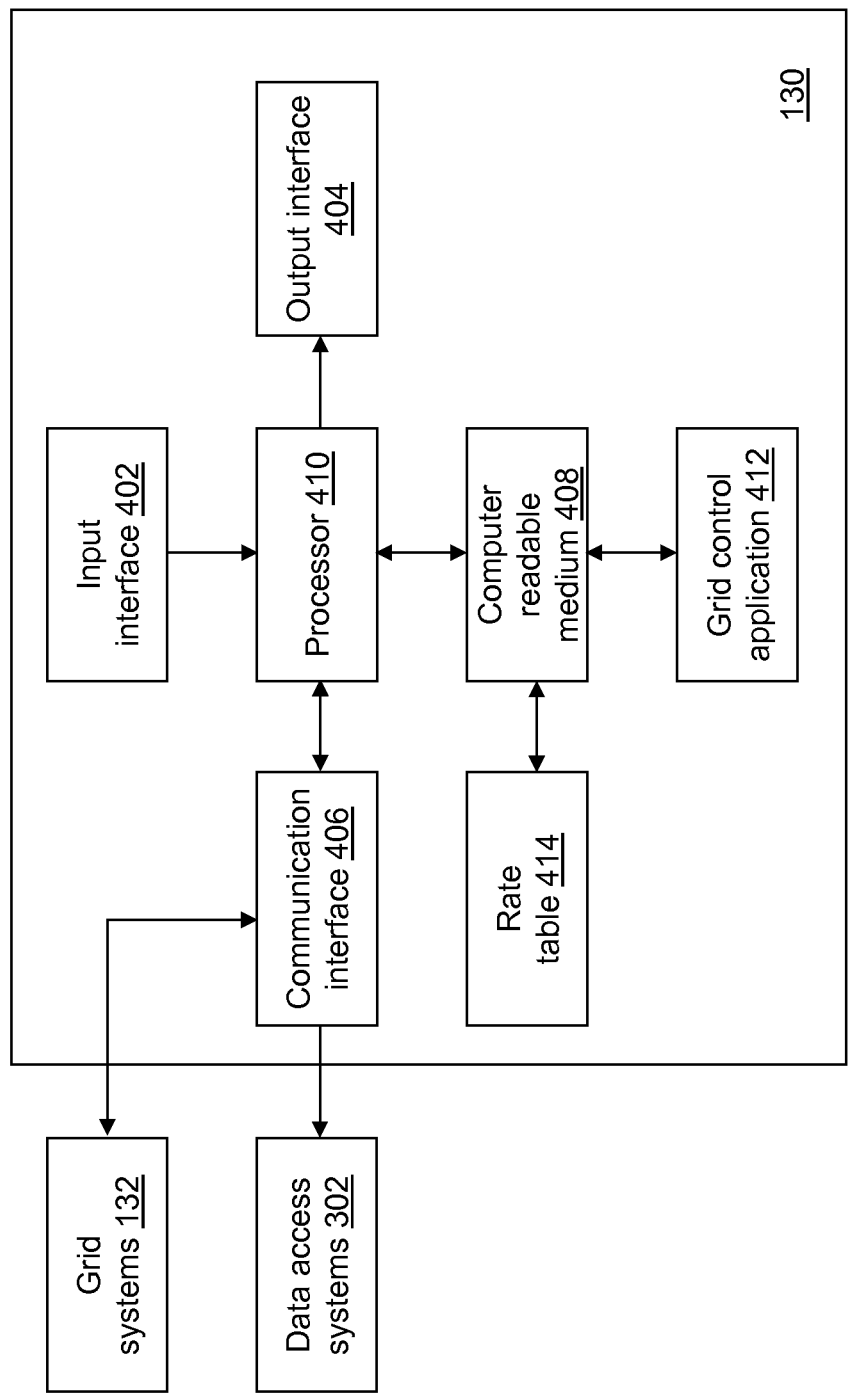
FIG. 4 depicts a block diagram of a grid control device of the ROC curve determination system of FIG. 3 in accordance with an illustrative embodiment.

Referring to FIG. 4, a block diagram of grid control device 130 is shown in accordance with an example embodiment. Grid control device 130 may include a second input interface 402, a second output interface 404, a second communication interface 406, a second computer-readable medium 408, a second processor 410, a grid control application 412, and a second rate table 414. Fewer, different, and additional components may be incorporated into grid control device 130.

Second input interface 402 provides the same or similar functionality as that described with reference to input interface 102 of data access device 100 though referring to grid control device 130. Second output interface 404 provides the same or similar functionality as that described with reference to output interface 104 of data access device 100 though referring to grid control device 130. Second communication interface 406 provides the same or similar functionality as that described with reference to communication interface 106 of data access device 100 though referring to grid control device 130. Data and messages may be transferred between grid control device 130 and grid systems 132 and/or data access systems 302 using second communication interface 406. Second computer-readable medium 408 provides the same or similar functionality as that described with reference to computer-readable medium 108 of data access device 100 though referring to grid control device 130. Second processor 410 provides the same or similar functionality as that described with reference to processor 110 of data access device 100 though referring to grid control device 130.

Grid control application 412 performs operations associated with controlling access to the cube of data distributed across grid systems 132 and with defining data stored in second rate table 414. The cube of data is created by distributing the data stored in data matrix 126 into data subcubes stored at a plurality of computing devices (grid nodes) of grid systems 132. For illustration, one or more rows of the cube of data are stored to each of the grid systems 132.

Some or all of the operations described herein may be embodied in grid control application 412. The operations may be implemented using hardware, firmware, software, or any combination of these methods. Referring to the example embodiment of FIG. 4, grid control application 412 is implemented in software (comprised of computer-readable and/or computer-executable instructions) stored in second computer-readable medium 408 and accessible by second processor 410 for execution of the instructions that embody the operations of grid control application 412. Grid control application 412 may be written using one or more programming languages, assembly languages, scripting languages, etc. Grid control application 412 may be implemented as a Web application.

Figure 5:
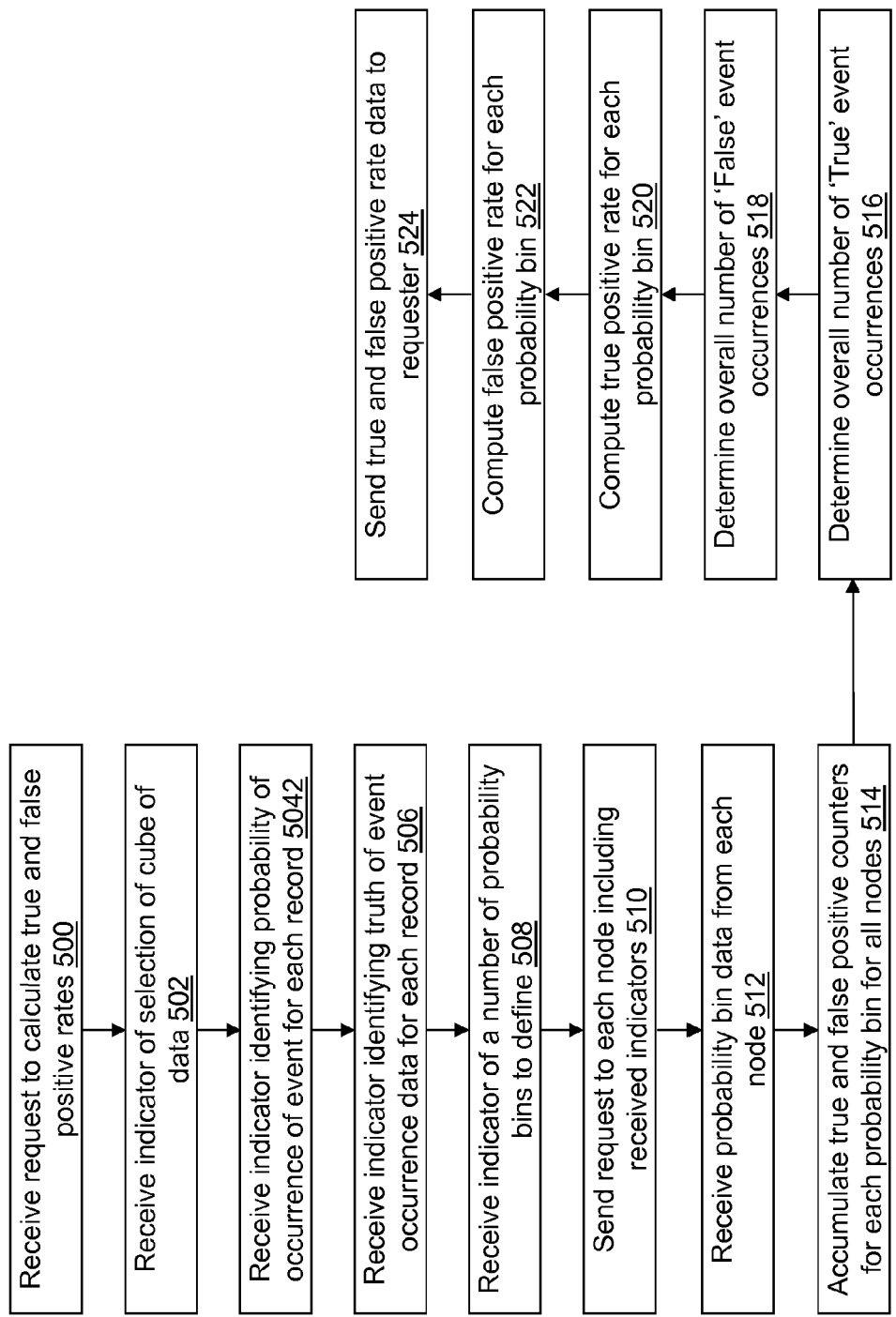
FIG. 5 depicts a flow diagram illustrating examples of operations performed by the grid control device of FIG. 4 in accordance with an illustrative embodiment.

Referring to FIG. 5, example operations associated with grid control application 412 are described. Additional, fewer, or different operations may be performed depending on the embodiment. The order of presentation of the operations of FIG. 5 is not intended to be limiting. Although some of the operational flows are presented in sequence, the various operations may be performed in various repetitions, concurrently, and/or in other orders than those that are illustrated. For example, a user may execute grid control application 412, which causes presentation of a first user interface window, which may include a plurality of menus and selectors such as drop down menus, buttons, text boxes, hyperlinks, etc. associated with grid control application 412 as understood by a person of skill in the art. As further understood by a person of skill in the art, various operations may be performed in parallel, for example, using threads.

In an operation 500, a request to compute true and false positive rates is received. For example, the request may be received by grid control application 412 from data access application 122 through second communication interface 406 after a selection by a user of data access application 122. Instead of data access application 122 performing operations 214 to 234, data access application 122 sends a request to grid control application 412 to create second rate table 414 for the cube of data, and grid control application 412 sends the created second rate table 414 to data access application 122. The created second rate table 414 sent to data access application 122 may be stored as rate table 124 at data access device 100 and output in a manner similar to that described in operations 236 and 238.

In an operation 502, a fifth indicator of the data for which to compute the true and false positive rates is received. For example, the fifth indicator indicates a location of the cube of data. As an example, the fifth indicator may be received by grid control application 412 from data access application 122 through second communication interface 406 after a selection by a user of data access application 122. In an alternative embodiment, the data for which to compute the true and false positive rates may not be selectable. For example, a most recently created data set may be used automatically.

In an operation 504, a sixth indicator identifying the probability of occurrence data for each record is received. For example, the sixth indicator may indicate that the data stored in a particular column in the cube of data includes the probability of occurrence data for each record. The sixth indicator may be received by grid control application 412 from data access application 122 through second communication interface 406 after a selection by a user of data access application 122. A default value for the sixth indicator may be the second to last column of data stored in the cube of data. In an alternative embodiment, the sixth indicator may not be received. For example, the second to last column of data stored in the cube of data may always include the probability of occurrence data for each record. Other columns of data may be the default column that includes the probability of occurrence data for each record.

Similar to operation 208, in an operation 506, a seventh indicator identifying the truth of event occurrence data for each record is received. For example, the seventh indicator may indicate that the data stored in a particular column in the cube of data includes the truth of event occurrence data for each record. The seventh indicator may be received by grid control application 412 from data access application 122 through second communication interface 406 after a selection by a user of data access application 122. A default value for the seventh indicator may be the last column of data stored in the cube of data. In an alternative embodiment, the seventh indicator may not be received. For example, the last column of data stored in the cube of data may always include the truth of event occurrence data for each record. Other columns of data may be the default column that includes the truth of event occurrence data for each record.

Similar to operation 210, in an operation 508, an eighth indicator indicating a value of a number of probability bins to define is received. The eighth indicator may be received by grid control application 412 from data access application 122 through second communication interface 406 after a selection by a user of data access application 122. A default value for the number of probability bins to define may further be stored, for example, in second computer-readable medium 408. In an alternative embodiment, the number of probability bins to define may not be received and the default value may be used.

As understood by a person of skill in the art, the fifth indicator, the sixth indicator, the seventh indicator, and/or the eighth indicator may be included in the request such that a single message is sent to grid control application 412 from data access application 122.

In an operation 510, a second request is sent to each grid node of the grid systems 132 that are storing the cube of data. The second request includes one or more of the fifth indicator, the sixth indicator, the seventh indicator, and/or the eighth indicator.

In an operation 512, probability bin data that includes true and false count value data for each bin of the probability bins is received from each grid node of the grid systems 132. For example, the true and false count value data may include a true count value of "True" event occurrences and a false count value of "False" event occurrences for each bin of the probability bins in a similar manner to that described in operations 222 and 224, respectively. As another example, the true count value data may include a number of true positives determined by accumulating a true count value from the true count values for successive probability bins of the probability bins and by subtracting the accumulated true count value for each probability bin from a total number of "True" event occurrences. The false count value data may include a number of false positives determined by accumulating a false count value from the false count values for successive probability bins of the probability bins and by subtracting the accumulated true count value for each probability bin from a total number of "False" event occurrences.

In an operation 514, overall true count values and overall false count values are accumulated for each bin of the probability bins received from each grid node of the grid systems 132, for example, by adding the true count values and the false count values for corresponding probability bins from each grid node of the grid systems 132.

In an operation 516, an overall number of "True" event occurrences is determined. For example, a total number of "True" event occurrences may be received from each grid node of the grid systems 132. The overall number of "True" event occurrences may be determined by adding the total number of "True" event occurrences received from each grid node of the grid systems 132.

In operation 518, an overall number of "False" event occurrences is determined. For example, a total number of "False" event occurrences may be received from each grid node of the grid systems 132. The overall number of "False" event occurrences may be determined by adding the total number of "False" event occurrences received from each grid node of the grid systems 132.

In operation 520, a true positive rate is computed for each probability bin. For example, the total true count values accumulated in operation 514 are divided by the overall number of "True" event occurrences if the true count value data includes the number of true positives. As another example, if the true count value data includes the true count value of "True" event occurrences, the number of true positives is determined for each probability bin and divided by the overall number of "True" event occurrences.

In operation 522, a false positive rate is computed for each probability bin. For example, the total false count values accumulated in operation 514 are divided by the overall number of "False" event occurrences if the false count value data includes the number of false positives. As another example, if the false count value data includes a false count value of "False" event occurrences, the number of false positives is determined for each probability bin and divided by the overall number of "False" event occurrences.

In an operation 524, the true positive and false positive rates computed for each probability bin are sent to data access application 122. For example, the true positive rate and the false positive rate computed for each probability bin may be stored in columns of second rate table 414 and sent to data access application 122.

Figure 6:
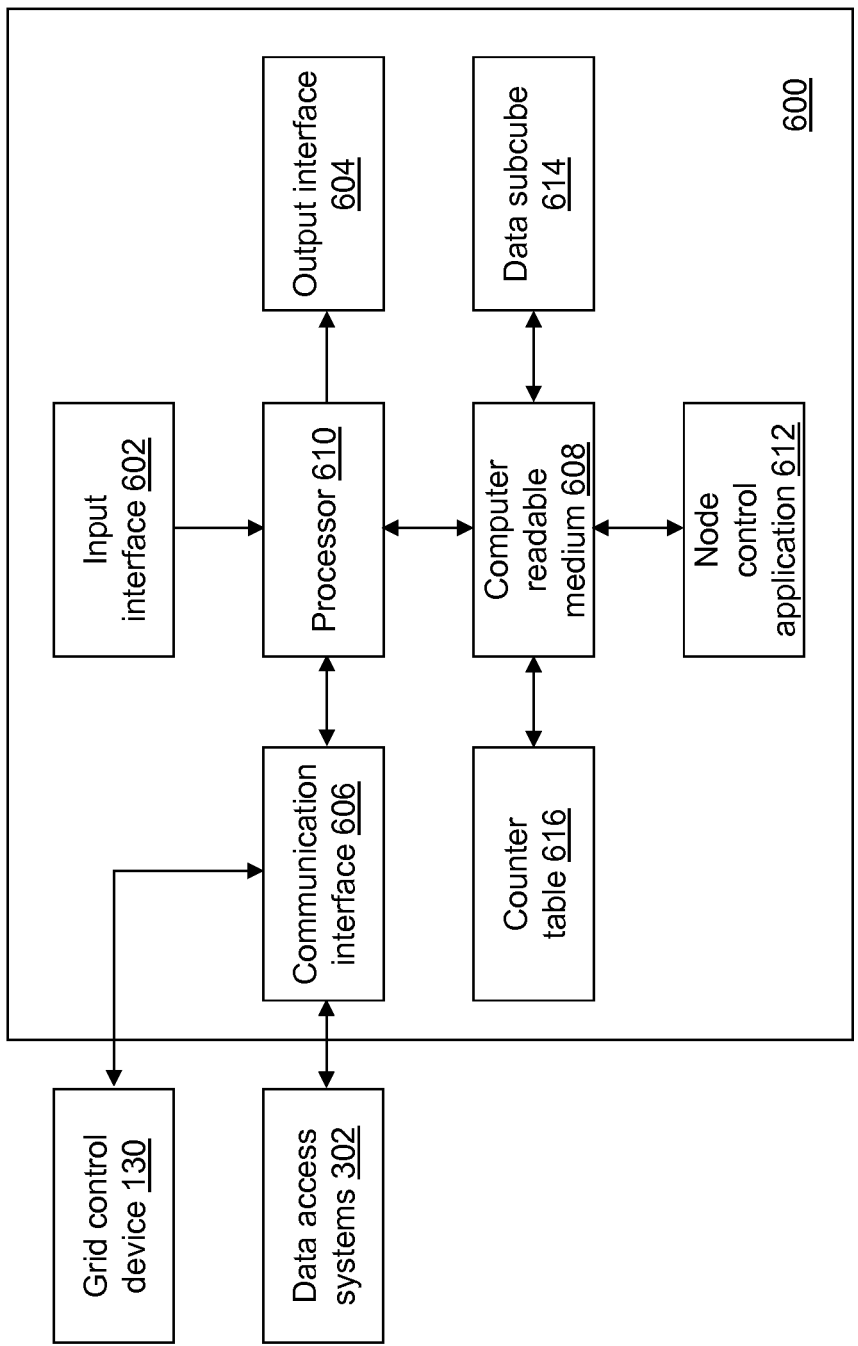
FIG. 6 depicts a block diagram of a grid node device of the ROC curve determination system of FIG. 3 in accordance with an illustrative embodiment.

Referring to FIG. 6, a block diagram of a grid node device 600 is shown in accordance with an illustrative embodiment. Grid node device 600 is an example computing device of grid systems 132. Grid node device 600 may include a third input interface 602, a third output interface 604, a third communication interface 606, a third computer-readable medium 608, a third processor 610, a node control application 612, a data subcube 614, and a counter table 616. Fewer, different, and additional components may be incorporated into grid node device 600.

Third input interface 602 provides the same or similar functionality as that described with reference to input interface 102 of data access device 100 though referring to grid node device 600. Third output interface 604 provides the same or similar functionality as that described with reference to output interface 104 of data access device 100 though referring to grid node device 600. Third communication interface 606 provides the same or similar functionality as that described with reference to communication interface 106 of data access device 100 though referring to grid node device 600. Data and messages may be transferred between grid node device 600 and grid control device 130 and/or the data access systems 302 using third communication interface 606. Third computer-readable medium 608 provides the same or similar functionality as that described with reference to computer-readable medium 108 of data access device 100 though referring to grid node device 600. Third processor 610 provides the same or similar functionality as that described with reference to processor 110 of data access device 100 though referring to grid node device 600.

Node control application 612 performs operations associated with controlling access to the data stored in data subcube 614 and with creating counter table 616. Some or all of the operations described herein may be embodied in node control application 612. The operations may be implemented using hardware, firmware, software, or any combination of these methods. Referring to the example embodiment of FIG. 6, node control application 612 is implemented in software (comprised of computer-readable and/or computer-executable instructions) stored in third computer-readable medium 608 and accessible by third processor 610 for execution of the instructions that embody the operations of node control application 612. Node control application 612 may be written using one or more programming languages, assembly languages, scripting languages, etc. Node control application 612 may be implemented as a Web application.

Data subcube 614 stores a portion of the cube of data distributed across grid systems 132 with each computing device of the grid systems 132 storing a different portion of the cube of data. Grid control device 130 further may store a portion of the cube of data.

A user may execute data access application 122 that interacts with grid control application 412 by requesting that grid control device 130 compute true and false positive rates for the cube of data. Grid control application 412 triggers processing by node control application 612 executing at each grid node of the grid systems 132. Any number of different users may be accessing the cube of data at any given time.

Various levels of integration between the components of ROC curve determination system 300 may be implemented without limitation as understood by a person of skill in the art. For example, node control application 612 and grid control application 412 may be the same or different applications or part of an integrated, distributed application supporting some or all of the same or additional types of functionality as described herein. As another example, data access application 122 and grid control application 412 may be the same or different applications or part of an integrated, distributed application supporting some or all of the same or additional types of functionality as described herein.

Figure 7:
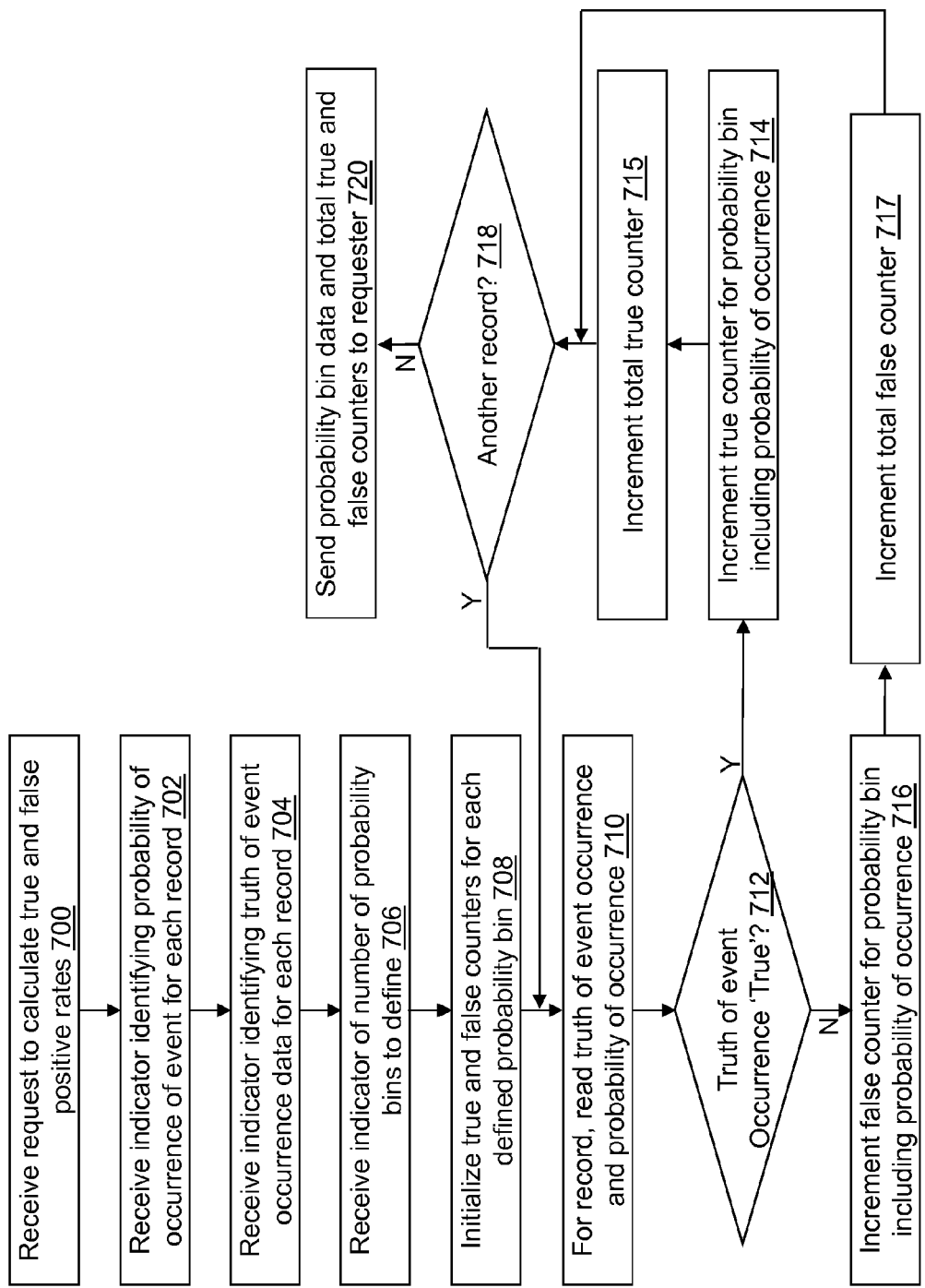
FIG. 7 depicts a flow diagram illustrating examples of operations performed by the grid node device of FIG. 6 in accordance with an illustrative embodiment.

Referring to FIG. 7, example operations associated with node control application 612 are described. Additional, fewer, or different operations may be performed depending on the embodiment. The order of presentation of the operations of FIG. 7 is not intended to be limiting. Although some of the operational flows are presented in sequence, the various operations may be performed in various repetitions, concurrently, and/or in other orders than those that are illustrated.

Similar to operation 500, in an operation 700, a request to compute true and false positive rates is received by node control application 612 from grid control application 412. Similar to operation 504, in an operation 702, a ninth indicator identifying the probability of occurrence data for each record is received by node control application 612 from grid control application 412. Similar to operation 506, in an operation 704, a tenth indicator identifying the truth of event occurrence data for each record is received by node control application 612 from grid control application 412. Similar to operation 508, in an operation 706, an eleventh indicator indicating a value of a number of probability bins to define is received by node control application 612 from grid control application 412.

Similar to operations 214 and 216, in an operation 708, true and false count values are initialized, respectively. Similar to operation 218, in an operation 710, the truth of event occurrence and probability of occurrence data is read from a record of data subcube 614.

Similar to operation 220, in an operation 712, a determination is made concerning whether or not the truth of event occurrence is "True" or has some other value that is understood to indicate "True". If the truth of event occurrence is "True", processing continues in an operation 714. If the truth of event occurrence is not "True", processing continues in an operation 716.

Similar to operation 222, in operation 714, the true count value for the probability bin including the probability of occurrence read from the record is incremented. In an operation 715, a total true count value is incremented.

Similar to operation 224, in operation 716, the false count value for the probability bin including the probability of occurrence read from the record is incremented. In an operation 717, a total false count value is incremented.

Similar to operation 226, in an operation 718, a determination is made concerning whether or not data subcube 614 includes another record to process. If data subcube 614 includes another record to process, processing continues in an operation 710. If data subcube 614 does not include another record to process, processing continues in an operation 720.

In operation 720, the probability bin data, total true count value, and total false count value are sent to grid control application 412. For example, the true count value computed for each probability bin and the false count value may be stored in columns of counter table 616 in third computer-readable medium 608 and sent to grid control application 412.

As another example, a number of true positives may be determined by accumulating a true count value from the true count values for successive probability bins of the probability bins and by subtracting the accumulated true count value for each probability bin from the total true count value. A number of false positives may be determined by accumulating a false count value from the false count values for successive probability bins of the probability bins and by subtracting the accumulated false count value for each probability bin from the total false count value. The number of true positives for each probability bin and the number of false positives for each probability bin may be stored in columns of counter table 616 in third computer-readable medium 608 and sent to grid control application 412.

Some methods for calculating ROC curves for models that predict the value of a binary variable can require a set of observations that are sorted by the model's probability that an observation is "TRUE". When the observations are split across the nodes of a computer grid, it is very inefficient to obtain this sorted list. Each part of the list on each node must be sent to a main node for sorting. The methods described in this disclosure can eliminate the need for sorting completely. The methods describe in this disclosure may require the sub-lists to be sent back to the main node in some cases. Note that the process of creating a predictive model may often require actually creating thousands or even millions of models, and then selecting the best ones based on the area under the ROC curve. Thus, the methods described in this disclosure can make the ROC curve calculation as efficient as possible. The disclosed method can be even more desirable when dealing with large sets of data that are typically encountered when using a grid of computers.

In order to calculate the True Positive Rate and False Positive rate for a given threshold, we must sum up the number of True Positive observations whose predicted probability exceeded the threshold, and sum up the number of True Negative observations whose predicted probability exceeded the threshold (which are the number of False Positives). There are two ways to do this:

1. Scan through the entire list of observations for each threshold and simply keep a count of both True Positives and False Positives. This takes $O(n*m)$ time, where n is the number of observations and m is the number of threshold values you want to use to draw the ROC curve.

2. First sort the list of observations by predicted probability, then make a single pass through the sorted list and calculate the number of True Positives and False Positives for each threshold. This takes $O(n \log n)$ time, where n is the number of observations, which is faster than $O(n*m)$ if log n<m. If you had 1,000,000 observations and wanted an ROC curve with 1,000 points, the $n*m=1,000,000,000$, and n log n~=20,000,000 . . . 50 times faster.

Computation on a Grid 1

In a "standard" grid configuration, where the data is distributed across a grid of computer nodes, no one grid node has all the data. This is one of the advantages of a grid . . . you can deal with data sets that are too large to fit into the memory of any single computer. However, when computing the ROC curve, this effectively prevents using a sort, because that requires all the data to be eventually aggregated on a single node . . . which might not be possible due to memory constraints. But, there is the following alternative:

Have each node sort the data that is has. Then have a single supervisory node request in turn from each of the other nodes the number of True Positives and False Positives for each threshold level to be calculated for the ROC curve. This would require $O(n \log n)$ time on each node plus the time for all nodes to communicate their results for each threshold value back to the supervisory node.

Computation 2—a More Efficient Way—Binning, No Sorting

For very large data sets (so called "big data") the sort might still take considerable time. In addition, since grids are typically shared among a number of users, the time to do the sort is time taken away from other users, even if it can be done faster in real time. Instead of sorting, we can do the following: Create a vector of bins for a reasonable number of probability levels. In a real world example, this might be around 1,000, which takes very little memory. Each bin would have a slot for the number of actual Positives and actual Negatives for that level. For our example of 15 observations, let's say we create 10 bins. This can be done with a single pass through the data.

What if the data is split up between nodes on a grid? The algorithm works by simply summing the tables across nodes. This can be done extremely simply and efficiently for an MPI base grid with a single MPI_REDUCE with MPI_SUM specified as the operation. The resulting table would end up on the supervisory node of the grid, but unlike the sorting example, where the size required on the supervisory node is the number of nodes times the size of the data on each node, the size of the table on the supervisory node is the same size as the table on anyone of the nodes (the number of rows in the final table is the same as the number of bins).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A method for finding a distributed computed solution for true positive rates and false positive rates comprising:
receiving, by each computing device of a plurality of computing devices, a value defining a number of probability bins, wherein a plurality of unsorted records is distributed across the plurality of computing devices;

initializing, by each computing device of the plurality of computing devices, a true count value for each of the defined number of probability bins;

initializing, by each computing device of the plurality of computing devices, a false count value for each of the defined number of probability bins;

(a) reading, by a current computing device, a truth of event occurrence from a current record of a subset of the plurality of unsorted records stored on the current computing device;

(b) reading, by the current computing device, a probability of occurrence from the current record;

(c) determining, by the current computing device, a probability bin of the probability bins that includes the probability of occurrence;

(d) incrementing, by the current computing device, the true count value of the determined probability bin when the truth of event occurrence indicates true;

(e) incrementing, by the current computing device, the false count value of the determined probability bin when the truth of event occurrence indicates false;

(f) repeating (a) to (e) with each record of the subset of the plurality of unsorted records stored on the current computing device as the current record;

(g) after processing the subset of the plurality of unsorted records stored on the current computing device, sending, by the current computing device, the true count value and the false count value for each probability bin of the probability bins to a master computing device, wherein (a) to (g) is performed by each computing device of the plurality of computing devices as the current computing device;

receiving, by the master computing device, the true count value and the false count value for each probability bin of the probability bins from each computing device of the plurality of computing devices;

determining, by the master computing device, a total number of true event occurrences;

determining, by the master computing device, a total number of false event occurrences;

computing, by the master computing device, a true positive rate for each probability bin of the probability bins based on the true count value of the probability bin and the determined total number of true event occurrences;

computing, by the master computing device, a false positive rate for each probability bin of the probability bins based on the false count value of the probability bin and the determined total number of false event occurrences; and outputting, by the master computing device, the true positive rate and the false positive rate for each probability bin of the probability bins for selection of an operating point to determine occurrence of an event.

2. The method of claim 1, further comprising incrementing, by each computing device of the plurality of computing devices, a total true count value when the truth of event occurrence indicates true, and a total false count value when the truth of event occurrence indicates false.

3. The method of claim 1, wherein computing the true positive rate for each probability bin of the probability bins comprises:

accumulating, by the master computing device, the true count value for successive probability bins of the probability bins;

subtracting, by the master computing device, the accumulated true count value for each probability bin from the determined total number of true event occurrences to define a number of true positives for each probability bin; and dividing, by the master computing device, the number of true positives for each probability bin by the determined total number of true event occurrences to define the true positive rate for each probability bin.

4. The method of claim 3, wherein computing the false positive rate for each probability bin of the probability bins comprises:

accumulating, by the master computing device, the false count value for successive probability bins of the probability bins;

subtracting, by the master computing device, the accumulated false count value for each probability bin from the determined total number of false event occurrences to define a number of false positives for each probability bin; and dividing, by the master computing device, the number of false positives for each probability bin by the determined total number of false event occurrences to define the false positive rate for each probability bin.

5. The method of claim 1, further comprising sending, by the master computing device, the value of the number of probability bins to define to each computing device of the plurality of computing devices.

6. The method of claim 1, further comprising:

accumulating, by each computing device of the plurality of computing devices, the true count value for successive probability bins of the probability bins before sending the true count value and the false count value, wherein the true count value sent to the master computing device is the accumulated true count value; and accumulating, by each computing device of the plurality of computing devices, the false count value for successive probability bins of the probability bins before sending the true count value and the false count value, wherein the false count value sent to the master computing device is the accumulated false count value.

7. The method of claim 1, further comprising:

accumulating, by each computing device of the plurality of computing devices, the true count value for successive probability bins of the probability bins before sending the true count value and the false count value;

determining, by each computing device of the plurality of computing devices, a total number of true event occurrences; and subtracting, by each computing device of the plurality of computing devices, the accumulated true count value for each probability bin from the determined total number of true event occurrences to define a number of true positives for each probability bin, wherein the true count value sent to the master computing device is the defined number of true positives.

8. The method of claim 7, further comprising:

accumulating, by each computing device of the plurality of computing devices, the false count value for successive probability bins of the probability bins before sending the true count value and the false count value;

determining, by each computing device of the plurality of computing devices, a total number of false event occurrences; and subtracting, by each computing device of the plurality of computing devices, the accumulated false count value for each probability bin from the determined total number of false event occurrences to define a number of false positives for each probability bin, wherein the false count value sent to the master computing device is the defined number of false positives.

9. The method of claim 2, wherein the total number of true event occurrences is determined by receiving the total true count value from each computing device of the plurality of computing devices; and the total number of false event occurrences is determined by receiving the total false count value from each computing device of the plurality of computing devices.

10. The method of claim 1, wherein the probability of occurrence for each unsorted record is determined by executing a model with other data associated with the current record prior to reading the probability of occurrence.

11. The method of claim 2, further comprising sending, by each computing device of the plurality of computing devices, the total true count value and the total false count value to the master computing device.

12. The method of claim 11, further comprising receiving, by the master computing device, the total true count value and the total false count value from each computing device of the plurality of computing devices.

13. The method of claim 12, wherein determining the total number of true event occurrences comprises summing the total true count value received from each computing device of the plurality of computing devices; and determining the total number of false event occurrences comprises summing the total false count value received from each computing device of the plurality of computing devices.

14. A system for finding a distributed computed solution for true positive rates and false positive rates comprising:
a plurality of computing devices, wherein a plurality of unsorted records is distributed across the plurality of computing devices, wherein each computing device of the plurality of computing devices comprises
a first processor; and
a first non-transitory computer-readable medium operably coupled to the first processor, the first computer-readable medium having first computer-readable instructions stored thereon that, when executed by the first processor, cause each computing device to
receive a value defining a number of probability bins;
initialize a true count value for each of the defined number of probability bins;
initialize a false count value for each of the defined number of probability bins;
read a truth of event occurrence from a current record of a subset of the plurality of unsorted records stored on the first non-transitory computer-readable medium;
(b) read a probability of occurrence from the current record;
(c) determine a probability bin of the probability bins that includes the probability of occurrence;
(d) increment the true count value of the determined probability bin when the truth of event occurrence indicates true;
(e) increment the false count value of the determined probability bin when the truth of event occurrence indicates false;
(f) repeat (a) to (e) with each record of the subset of the plurality of unsorted records stored on the first non-transitory computer-readable medium as the current record; and after (f), send the true count value and the false count value for each probability bin of the probability bins to a master computing device; and
the master computing device comprising
a second processor; and
a second computer-readable medium operably coupled to the second processor, the second computer-readable medium having second computer-readable instructions stored thereon that, when executed by the second processor, cause the master computing device to
receive the true count value and the false count value for each probability bin of the probability bins from each of the plurality of computing devices;
sum the received true count values for each probability bin of the probability bins;
sum the received false count values for each probability bin of the probability bins;
determine a total number of true event occurrences;
determine a total number of false event occurrences;
compute a true positive rate for each probability bin of the probability bins based on the summed true count value of the probability bin and the determined total number of true event occurrences;
compute a false positive rate for each probability bin of the probability bins based on the summed false count value of the probability bin and the determined total number of false event occurrences; and
output the true positive rate and the false positive rate for each probability bin of the probability bins for selection of an operating point to determine occurrence of an event.

15. The system of claim 14, wherein the probability of occurrence for each unsorted record is determined by executing a model with other data associated with the current record prior to reading the probability of occurrence.

16. The system of claim 14, wherein the first computer-readable instructions further cause each computing device to increment a total true count value when the truth of event occurrence indicates true and to increment a total false count value when the truth of event occurrence indicates false.

17. The system of claim 16, wherein the first computer-readable instructions further cause each computing device to send the total true count value and the total false count value to the master computing device.

18. The system of claim 17, wherein the second computer-readable instructions further cause the master computing device to receive the total true count value and the total false count value from each of the plurality of computing devices.

19. The system of claim 18, wherein determining the total number of true event occurrences comprises summing the total true count value received from each of the plurality of computing devices; and determining the total number of false event occurrences comprises summing the total false count value received from each of the plurality of computing devices.

20. The system of claim 14, wherein computing the true positive rate for each probability bin of the probability bins comprises:
accumulating, by the master computing device, the true count value for successive probability bins of the probability bins;
subtracting, by the master computing device, the accumulated true count value for each probability bin from the determined total number of true event occurrences to define a number of true positives for each probability bin; and dividing, by the master computing device, the number of true positives for each probability bin by the determined total number of true event occurrences to define the true positive rate for each probability bin.

21. The system of claim 20, wherein computing the false positive rate for each probability bin of the probability bins comprises:

accumulating, by the master computing device, the false count value for successive probability bins of the probability bins;

subtracting, by the master computing device, the accumulated false count value for each probability bin from the determined total number of false event occurrences to define a number of false positives for each probability bin; and dividing, by the master computing device, the number of false positives for each probability bin by the determined total number of false event occurrences to define the false positive rate for each probability bin.

22. The system of claim 14, wherein the second computer-readable instructions further cause the master computing device to send the value of the defined number of probability bins to each computing device of the plurality of computing devices.

23. The system of claim 14, wherein the first computer-readable instructions further cause each computing device to:

accumulate the true count value for successive probability bins of the probability bins before sending the true count value and the false count value;

determine a total number of true event occurrences; and subtract the accumulated true count value for each probability bin from the determined total number of true event occurrences to define a number of true positives for each probability bin, wherein the true count value sent to the master computing device is the defined number of true positives.

24. The system of claim 23, wherein the first computer-readable instructions further cause each computing device to:

accumulate the false count value for successive probability bins of the probability bins before sending the true count value and the false count value;

determine a total number of false event occurrences; and subtract the accumulated false count value for each probability bin from the determined total number of false event occurrences to define a number of false positives for each probability bin, wherein the false count value sent to the master computing device is the defined number of false positives.

* * * * *

UNITED STATES PATENT AND TRADEMARK OFFICE
CERTIFICATE OF CORRECTION

PATENT NO. : 10,192,166 B2
APPLICATION NO. : 14/208302
DATED : January 29, 2019
INVENTOR(S) : Lawrence E. Lewis et al.

Page 1 of 1

It is certified that error appears in the above-identified patent and that said Letters Patent is hereby corrected as shown below:

In the Specification

Column 15, Line 53:
Delete the phrase "0(n log n)" and replace with --O(n log n)--.

In the Claims

Claim 14, Column 19, Line 50:
Delete the phrase "read a truth of event" and replace with --(a) read a truth of event--.

Signed and Sealed this
Second Day of April, 2019

Andrei Iancu
*Director of the United States Patent and Trademark Office*